(12) United States Patent
Zieman

(10) Patent No.: US 6,401,061 B1
(45) Date of Patent: Jun. 4, 2002

(54) COMBINATORIAL COMPUTATIONAL TECHNIQUE FOR TRANSFORMATION PHRASE TEXT-PHRASE MEANING

(76) Inventor: Yuri L. Zieman, 199 Barbara Rd., Waltham, MA (US) 02453

( * ) Notice: Subject to any disclaimer, the term of this patent is extended or adjusted under 35 U.S.C. 154(b) by 0 days.

(21) Appl. No.: 09/342,029

(22) Filed: Jun. 28, 1999

Related U.S. Application Data

(60) Provisional application No. 60/134,003, filed on May 13, 1999.

(51) Int. Cl.$^7$ .......................... G06F 17/21; G06F 17/20
(52) U.S. Cl. .............................................. 704/10; 704/1
(58) Field of Search ................... 704/1, 9, 10; 707/500, 707/530, 532, 1, 2, 103, 104

(56) References Cited

U.S. PATENT DOCUMENTS

| | | | |
|---|---|---|---|
| 4,703,425 A | * 10/1987 | Muraki | 704/9 |
| 5,099,425 A | * 3/1992 | Yuji et al. | 704/1 |
| 5,109,509 A | * 4/1992 | Katayama et al. | 704/9 |
| 5,128,865 A | * 7/1992 | Sadler | 704/1 |
| 5,151,857 A | * 9/1992 | Matsui | 704/9 |
| 5,369,574 A | * 11/1994 | Masegi et al. | 704/9 |
| 5,559,693 A | * 9/1996 | Anick et al. | 84/9 |
| 5,794,050 A | * 8/1998 | Dahlgren et al. | 704/9 |
| 6,006,221 A | * 12/1999 | Liddy et al. | 707/5 |
| 6,052,656 A | * 4/2000 | Suda et al. | 704/9 |
| 6,199,034 B1 | * 3/2001 | Wical | 704/9 |

OTHER PUBLICATIONS

Y. L. Zieman and H. L. Bleich, "Conceptual Mapping of User's Queries to Medical Suject Headings", Proceedings of 1997 AMIA Annual Fall Symposium, Nashville, TN USA, Oct. 25–29, 1997, pp 519–522.

M. Bates, R. Bobrow, P. Fung, R. Ingria, F. Kubala, J. Makhoul, L. Nguyen, R. Schwartz, D. Stallard, "The BBN/HARC Spoken Language Understanding System", IEEE International Conference on Acoustics, Speech, and Signal Processing, Minneapolis, MN USA, Apr. 27–30, 1993 pp. II–111–II–114.

G. Yu and H. Gish, "Identification of Speakers Engaged in Dialog", IEEE International Conference on Acoustics, Speech, and Signal Processing, Minneapolis, MN USA, Apr. 27–30, 1993, pp. II–383–II–386.

* cited by examiner

*Primary Examiner*—Patrick N. Edouard
(74) *Attorney, Agent, or Firm*—Perkins, Smith & Cohen, LLP; Jerry Cohen; Jacob N. Erlich

(57) ABSTRACT

A combinatorial system for extracting major meaning components of a phrase or sentence text in natural language and vice versa. This system allows more intelligent processing and retrieval of textual information in computers. More specifically, the system is divided into three parts. The first is based on a specially defined set of universal primary or atomic abstract concepts, Semantic Factors and rules and methods for assembling and modifying the Semantic Factors. The second is based on a specially defined set of morpheme-type linguistic elements of a specific language, referred to herein as S-Morphs, that are formed into a dictionary. The third part relies upon algorithms and rules for using the two parts described above to translate text into its conceptual description or meanings and/or point from a meaning to relevant objects.

27 Claims, 7 Drawing Sheets

COMBINATORIAL COMPUTATIONAL TECHNIQUE FOR TRANSFORMATION PHRASE TEXT-PHRASE MEANING

CROSS REFERENCE TO RELATED APPLICATIONS

Priority is claimed under 35 U.S.C. §119 (e) for the present invention from a Provisional Application filed on May 13, 1999, Ser. No. 60/134003 with the same title and inventor as the present application.

FIELD OF THE INVENTION

The present invention relates generally to language processing and, more particularly, to extracting meaning components from text for intelligent processing. The present invention also relates to the retrieval of or pointing to text relating to given meanings.

BACKGROUND OF THE INVENTION

Most current methods of intelligent text processing and/or retrieval, in order to deal with conceptual contents of the text, focus on the following: a) developing advance dictionaries and thesauri covering as much as possible the vocabulary of the language with extended lists of links between synonyms; b) developing formal grammar for the language; and c) developing semantic network, maps or other ways to describe the relationship between concepts represented in language. To meet the requirements of today's textual data processing such methods require huge computer systems and resources. For example, the National Library of Medicine (National Institutes of Health) conducts a long-term project—Universal Medical Language Systems (UMLS) by the U.S. Department of Health and Human Services; $10^{th}$ Edition, January 1999. Their Thesaurus includes 1,358,891 phrases and their semantic network works with 626,893 concepts. And, this is only in the health care domain. However, even such a large language knowledge base, built as a union of about 50 different standard controlled vocabularies, does not satisfy the practical need of efficient medical text processing and retrieval. The inefficiencies of this system and similar systems are shown either by the large varieties and number of different responses, many of which are irrelevant, to the input phrases that yield essentially identical meanings, or by no response at all to many of them.

In the present invention "language" is defined broadly herein as any form of human communications that can be represented in a form suitable for processing by a computing system. Examples of language include(but not limited to): the many human spoken languages, sign/picture language, signals, electronic transmissions, pictures, etc.

Prior art systems have limitations when searching, finding meanings, or pointing to locations in data being analyzed for "objects" or groupings of concepts. In the present invention there are two types of objects defined. The first, referred to as "text objects," are formed from pieces of text of a very different size, beginning with short phrases and ending with the whole archives, databases, and libraries substantially stored as text. For example, a database itself may be an "object" for the purposes of the present invention. "Text" in this paragraph means written samples of a human language. The second type are objects, also of a very different size, that are stored in the computer memory in any "non-text" format, like computer language files, tables, non-text databases, images, slides, movies, sound recordings, web pages, etc. In the present invention objects of either type are handled in the same fashion, and the retrieval of any object included in a Semantic Index (see below) is independent of the size and complexity of the object and is based on the conceptual description of this object. Hereinafter, "object" is defined as either type of object defined above except where specified differently from the context.

Hereinafter, "text" is defined broadly as any code representation of language, as defined above, that is suitable for processing by a computing system. Examples of text include (but not limited to): ASCII code representations (of letters, numbers, symbols/signs and control codes), phonic symbols (phonemes, triphonemes), hexadecimal, octal, binary, graphic symbols, etc.

Known prior art methods of extracting meanings from text (and the reverse) suffer from literal matching which is very sensitive to wording, phrase structure, and punctuation of the text. In such systems small changes can result in unpredictable changes in the quantity and quality of the resulting response. An illustrative example may be found from using the common search engines on the Internet. A sample search of "safe pregnancy" on Yahoo resulted in seven hits, but "safe pregnancies" resulted in more than six thousand hits.

It is an object of the present invention to relate meanings and text to each other.

It is another object of the present invention to provide an efficient retrieval of meanings with substantially no limitations on syntax in general, including, wording, phrase structure and punctuation.

It is still another object of the present invention to search text or other data for any conceptually predefined objects, where said objects are defined by a set of meanings irrespective of syntax, wording, phrase structure and punctuation.

SUMMARY OF THE INVENTION

The objects of the present invention are met in a hardware and software system that forms a combinatorial computer system that extracts meanings from phrases or sentences expressed in a language. The language is formed into a text that is input into a computing system for processing. The present invention is based on four main parts. First, a set of universal basic or primary concepts, called Semantic Factors are formed. These Semantic Factors are independent of any language. Second, a set of morpheme-type elements of the language being processed is formed, called S-Morphs. The S-Morphs are compiled into a dictionary relating to the Semantic factors. The third part comprises algorithms and rules for splitting words from phrases into S-Morphs, and from the S-Morph dictionary relating the S-morphs to the concepts and thereby to meanings. The fourth part comprises Semantic Indexes for objects to be retrieved and algorithms using these Semantic Indexes for pointing to the objects. In the Semantic Index the objects are described using the same set of Semantic Factors that is used to describe the input to the system as a query. As a result the system is capable of accepting any queries in plain English, for example, "Find or point to any text associated with high blood pressure"? Another aspect of the present invention is that if an unknown S-Morph is found the system simply passes over it and continues.

Herein, as discussed before, concepts are independent from the lexicon, morphology and syntax of any given language. This allows the Semantic Factor base to be significantly smaller than prior art techniques that evolve large complex grammars, etc.

Further, the present invention provides modifiers for the Semantic Factors that allow comparative and/or quantification features to be associated with the Semantic Factors. With this addition, complex meanings can be derived from text with modest computing systems.

In a preferred embodiment, a grouping of Semantic Factors can be compiled using S-Morph dictionary, referred to as a group, that can be specified as the description of the meaning of an input query. Similarly, for all output objects, groups can be specified describing their meanings. Input text can then be processed looking for such objects. When found, by comparison of the query group and output objects groups, the relevant objects can be output. It is important to notice that the Semantic Factors describe concepts but not actual words, so, for example "blood," could be found in the text for the word "anemia." Also the reverse could occur. It is also important to notice that the Semantic Factors, as described elsewhere, are independent of the specific language so the same Semantic Factors can be used with many languages.

Other objects, features and advantages will be apparent from the following detailed description of preferred embodiments thereof taken in conjunction with the accompanying drawings in which:

DETAILED DESCRIPTION OF PREFERRED EMBODIMENTS

Figure 1:
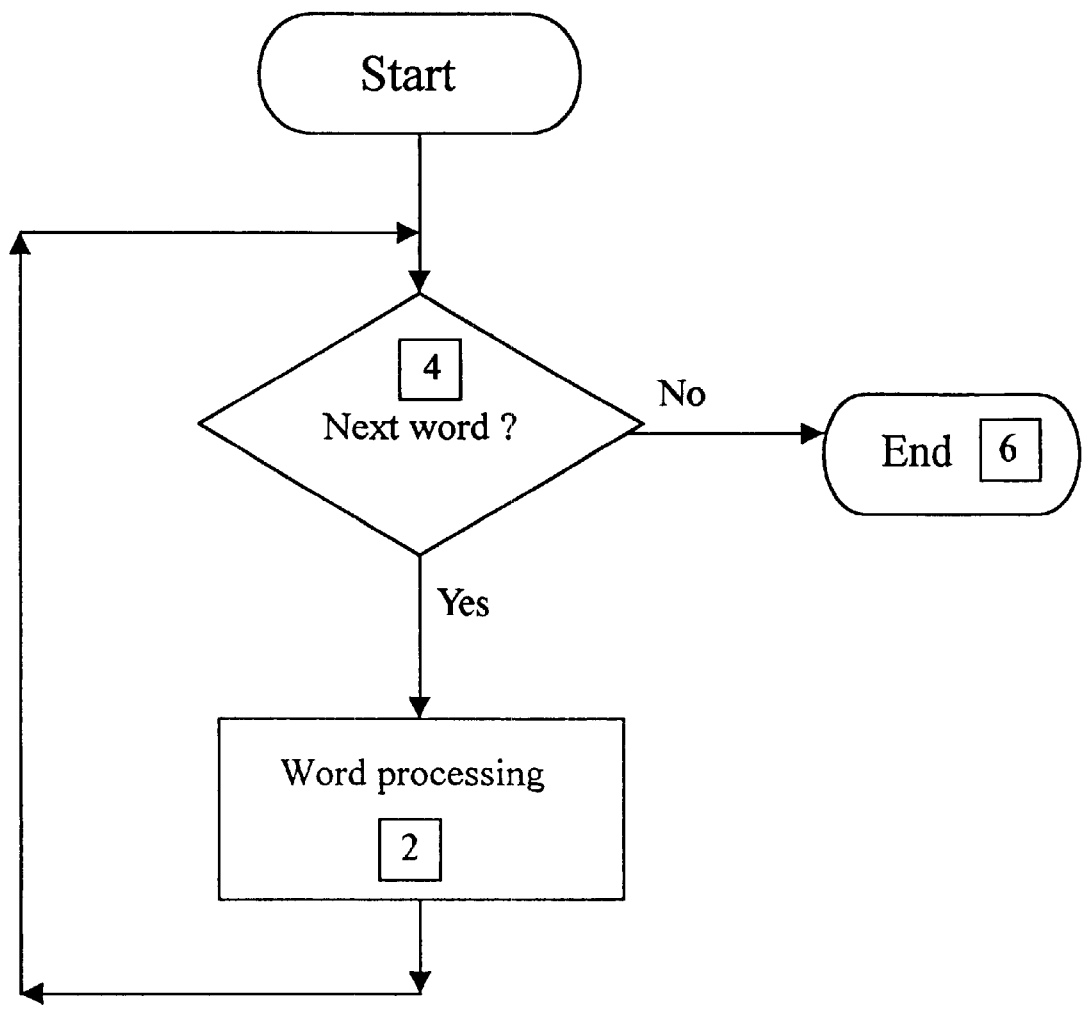
FIG. 1 is a flow chart/block diagram implementation of the present invention.

In order to better understand the present invention it is desirable to understand the following applications and examples where the invention can be utilized to advantage.

Semantic Factors:

The Semantic Factors may be considered a simple internal language that represents major meaning components of text phrases. The vocabulary of the language consists of Semantic Factors—names or codes for primary, fundamental, or basic concepts. Each Semantic Factor represents a concept that is considered as a simple concept but capable of contributing to describing complicated concepts. Though, from the general point of view, many Semantic Factors may share some components of meaning, within the present invention all concepts represented by Semantic Factors are unique and independent. Correspondingly, the name or code for each Semantic Factor is unique. There is no interaction between the Semantic Factors in describing any concept. In this way the model is purely combinatorial—the meaning of any complicated concept is represented just by a combination of Semantic Factors. Like standard bricks and panels that may be used for constructing innumerable architectural pieces, Semantic Factors may be used for describing innumerable concepts. In a preferred embodiment there may only be about 4,000 Semantic Factors needed to cover all the varieties of concepts, however, more such factors may be used to advantage in other preferred embodiments. The decision for choosing a concept as a primary one cannot be defined in strict terms and comes as a result of iterative analysis of input texts. For example, consider starting with a small defined set of Semantic Factors using as an input for the analysis existing classifications of concepts like the Synopsis of Categories at the beginning of Roget's Thesaurus (any edition). The meaning of each of these categories should be analyzed and described using the set of Semantic Factors. First, if the analysis considered to be appropriate the next Category is processed. Second, if not, there is a possibility that some Semantic Factor is either missing or is too encompassing and should be split into more primitive ones. In the first case a new Semantic Factor is added to the set. In the second case two or more Semantic Factors replace the one judged to be too encompassing. Such replacement may also require defining new Semantic Factors as well as removing some old ones. The analysis continues until it is found to be satisfactory for all categories.

For example, "BLOOD" and "PRESS" are selected as primary concepts and for readability here and below English words are used for encoding corresponding Semantic Factors, and the character "&" is used as a separator between the Semantic Factors (e.g. &BLOOD and &PRESS). Then the major meaning components of the phrase "BLOOD PRESSURE" will be described as &BLOOD&PRESS. Though, the basic concepts above are rather complicated both anatomically and physically, the reason for choosing them as basic is their being useful concepts for many words. For example, BLOODY, BLOODLESS, HEMIC, BLEEDING, HEMORRHAGE, etc. may be described using the Semantic Factor &BLOOD to represent the concept BLOOD; and PRESSED, COMPRESSION, IMPRESSION, etc. may be described using the Semantic Factor &PRESS to represent the concept PRESS. One requirement for a set of Semantic Factors is that the set should be necessary and sufficient to describe the major components of any complicated subject. The order of the Semantic Factors in such representation does not matter. For example, they may be ordered or sorted alphabetically by their names or codes or by some other manner. Regardless of the ordering or sorting the representation becomes unique for any subject.

Modifiers are provided that can be used to affect the Semantic Factors. The modifiers keep the original concepts but add to them a quantitative measure. Examples of quantitative modifiers are: "MUCH," "HIGH," "EXCESS," which may be encoded as "+," and "LITTLE," " LOW," "DEFICIT," which may be encoded as "−," and "LACK," "ABSENCE," which may be encoded as "'." Other quantitative modifiers may be defined, for example "ABOVE/BELOW," for other concepts as are known in the art.

With the above encoding, the Semantic Factor description for ANEMIA will be &-BLOOD (too little blood), for HYPERTENSION it will be &+PRESS&BLOOD (high pressure blood), and for HYPOTENSION it will be &−PRESS&BLOOD (low pressure blood). Modification of Semantic Factors extends the variety of meaning for components represented with Semantic Factors.

S-Morphs

Morphemes in linguistics are minimal elements of a language bearing their own meaning. To achieve a perfect automatic identification of morphemes in a language phrase is not a trivial task at all. To simplify this problem for each human language (or language generally) a set of S-Morphs are defined in the present invention. These S-Morphs form quasi-minimal elements with their own meanings. The decision about the deviation from being minimal is taken individually for each specific S-Morph. Specific S-Morphs and the basis for such decisions is the simplicity of the S-Morph identification in the phrase. The meaning of each S-Morph is described using Semantic Factors and all these descriptions constitute an S-Morph Dictionary. S-Morph dictionary is actually a language Knowledge Base within the present invention. In multilingual applications of the present invention there should be a special S-Morph dictionary for each language (English, Spanish, etc.).

It is important to notice that in the process of defining the meanings of S-Morphs with the Semantic Factors, multiple alternative meanings—homonyms on the level of S-Morphs—are taken into consideration. Some of S-Morphs may have two or more completely different meaning, and each of these alternative meanings will be represented in the description with its own Semantic Factors. For example, for S-Morph HIGH two different meanings may be defined: a)excessive quality or quantity, like in 'high skills', 'high standard'; and b)upward extension or location, like in 'high mountain', 'high in the sky'. As a result the Semantic Factor description for the S-Morph HIGH may look like: HIGH= &+&HEIGHT where the first meaning is reflected with the modifier+and the second—with the Semantic Factor &HEIGHT.

The process of compiling the S-Morph Dictionary is based again on an iterative text analysis very similar to the compiling the set of Semantic Factors described above. First an initial small S-Morphs Dictionary is created with a small vocabulary. The Semantic Factor description for each S-Morph in this dictionary may be derived by first describing the meaning of each S-Morph with a short, clear text (say, by using existing dictionaries) and then finding a combination of Semantic Factors "matching" this text. The degree of "matching" may be by a first accepted "best way" which may be modified later by trial and errors methods. After this "matching," analyzing the text iteratively with the Semantic Factors may be started using algorithms and/or techniques presented in the invention. Any accepted vocabulary or thesaurus may be used and input into the system at this point. An initial preferred embodiment of the present invention was built in and for the medical field. "Medical Subject Headings" from the National Library of Medicine (1999 edition from the U.S. Dept. of Health and Human Services, National Institutes of Health) was used and input into the system as an initial source for the S-Morph Dictionary. Each phrase was iteratively analyzed, split into S-Morphs from the Dictionary and a Semantic Factor description built from the S-Morphs. The result is evaluated and if found satisfactory the next subject phrase is analyzed. If the result is not satisfactory, modifications may be made, including deletions/editing of the S-Morph and the associated matching Semantic Factors. The analysis continues until a satisfactory result is found for all subject phrases.

A feature of the present invention, besides the morpheme approach, which makes a great difference compared to other methods regarding practical and efficient implementation, is the limitations and restrictions at the stage of defining the meanings of S-Morphs. Many important aspects of meanings in human languages, like differences between grammatical forms (nouns, verbs, adjectives, etc.), tenses and voices (passive and active) for verbs, plural and singular for nouns, are not important for retrieval and not used with the present invention.

Since text may contain words or parts of words that have meanings neglected within the model, as described above, the present inventive system defines an Empty S-Morph that relates to no meaning for any such word or part of a word.

There are four main parts of the S-Morph Dictionary in a preferred embodiment model of the present invention:

a) Premorphs—S-Morphs identified only at the beginning of the word, b) Inmorphs—S-Morphs identified at any location within the word, c) Postmorphs—S-Morphs identified only at the end of the word, d) Wordmorphs—S-Morphs identifies as separate words.

A special subpart in the Wordmorph part of S-Morph Dictionary is constituted by abbreviations. Abbreviations in a preferred embodiment of the present invention are described within the S-Morph Dictionary with the Semantic Factors the same way as the corresponding full text for the abbreviation would be described. This results in an ability within the present invention to interpret abbreviations conceptually as well as words which is very important, especially for scientific and political texts.

The following table is a small sample of an S-Morph dictionary where the Morph types, Pr, In, Post and Wo, are given in the parentheses and all S-Morphs are sorted alphabetically. Note that different Morphs, classified as different types, may relate to the same concepts and meanings. Also, the same S-Morph may have different meanings as reflected in the Semantic Factors, ("elevat," "high" and "im") The last column lists some examples of the words in which the listed S-Morphs appear. In the table alternative meanings for S-Morphs ELEVAT, HIGH, IM are included. Generally, when S-Morpths have multiple meanings, all are included.

| S-MORPH (type) | Semantic Factor | Word Examples |
|---|---|---|
| alti (In) | &HEIGHT | altitude, altimeter |
| baro (IN) | &PRESS | barometer, barotrauma |
| bleed (In) | &+FLOW&BLOOD | bleeding, bleeder |
| blood (IN) | &BLOOD | blood, bloodletting |
| elevat (IN) | &+HEIGHT&MAKE | elevated mind, but elevator |
| ema (Po) | &IN | edema, eczema |
| emia (Po) | &BLOOD&CONDITION | anemia, leukemia |
| endo (In) | &In | endocrine, endogenous |
| height (WO) | &HEIGHT | height |
| hemo (In) | &BLOOD | hemorrhage, hemoglobin |
| high (Wo) | &+HEIGHT | high pressure, but high hill, |
| im (Pr) | &'&IN | imbedded, implant, but imperfect |
| manometr (Im) | &MEASURE&PRESS | manometry, manometric |
| press (In) | &PRESS | compress, pressure |
| tono (In) | 7PRESS&SOUND | tonometry, tonogram |

In a preferred embodiment of the present invention, there are only about 10,000 S-Morphs constituting the whole Language Knowledge Base. For many other languages the knowledge base would be about the same size. The present invention's use of S-Morphs provides for a significantly reduced representation for any language in comparison to prior art systems. This reduction results in a corresponding significant decrease of required computer resources to process any language. This efficiency is achieved by replacing actual language constructions with the above morpheme-type dictionary entries.

In embodiments of the present invention, the software is written in ANSI C but virtually any programming language can be used. It is portable (but in other preferred embodiments the program may not be portable) and runs on virtually any computing system: PC's, Mac's, Sun's, lap tops, etc., and/or distributed systems joined over local and wide area (like the Internet) communication networks, under any of the popular operating systems including Unix, Windows 9x/NT/95/98, the Mac, and DOS. The system must have access to or enough memory resident for storing the databases described herein, and access to suitable presentation equipment as known in the art. In a preferred embodiment, the engine itself is about 100 KB, and the databases require about 1 MB of memory.

As is well known in the art there are hardware and software methods that are often interchangeable for performing operations. In preferred embodiments the means for forming and the process step of forming a set or list or grouping of text or items can be accomplished by a software program or by hardware or by combinations thereof. Such a list could be of concepts, of linguistic elements, of S-Morphs, and of resulting encoded forms of the list of items. The items could be stored in memory or be communicated to the computer system from a remote location. In a similar manner, means for splitting or parsing words of text into linguistic elements can be accomplished by software or hardware or combinations of both. In this splitting the words are compared to stored words or parts of words that are associated with S-Morphs which lead to concepts and then to meanings. The required analyses, storing, comparing, and outputting are well known in the computer arts, and as stated above each step can be accomplished with hardware and software or combinations thereof.

EXAMPLE A

Text to Meaning (Generating Meaning from Given Text)

The input phrase text is encoded suitably for inputting into a suitable computing system where it goes through the S-Morph analysis process of identifying all S-Morphs in the phrase. The phrase is split or broken into S-Morphs that are then used to build a list of the corresponding Semantic Factors. There is no duplication of the Semantic Factors in the list—if two or more S-Morphs contribute to the list with the same Semantic Factor, the Semantic Factor is used only once. The resulting set of Semantic Factors after being sorted alphabetically, in a preferred embodiment, is called a Phrase Concept Code.

There is an inventive feature in the process of generating the Phrase Concept Code: human behavior is simulated to some extent. During the analysis if a piece of the phrase cannot be associated with any S-Morph in the dictionary it is designated by the system as "not known" and skipped without contributing to the Phrase Concept Code. But the process does not stop at this point and the rest of the phrase is analyzed and interpreted. A "not known" piece may be a whole word or even a piece of the word, and it is simply not used to build meaning in a preferred embodiment. For example, analysis of the word GASTROZIEMANENTEROLOGY where the inventor's last name ZIEMAN is inserted between the two roots of the word GASTROENTEROLOGY will split the word and conclude that ZIEMAN is a not known piece but the rest bears the meaning of GASTROENTEROLOGY. As a result the system can accept and interpret correctly many misspelled words. See below for more discussion.

Referring to FIG. 1, the block labeled START indicates the start of the computer processing of text already stored or otherwise available to the processing computer system as separate words encoded in a form suitable for such processing. There are a number of known methods converting speech to text in a computer compatible form. These methods are useful with the present invention and can be used advantageously with the present invention for processing. But, the present invention starts with the written text ready for processing.

Figure 2:
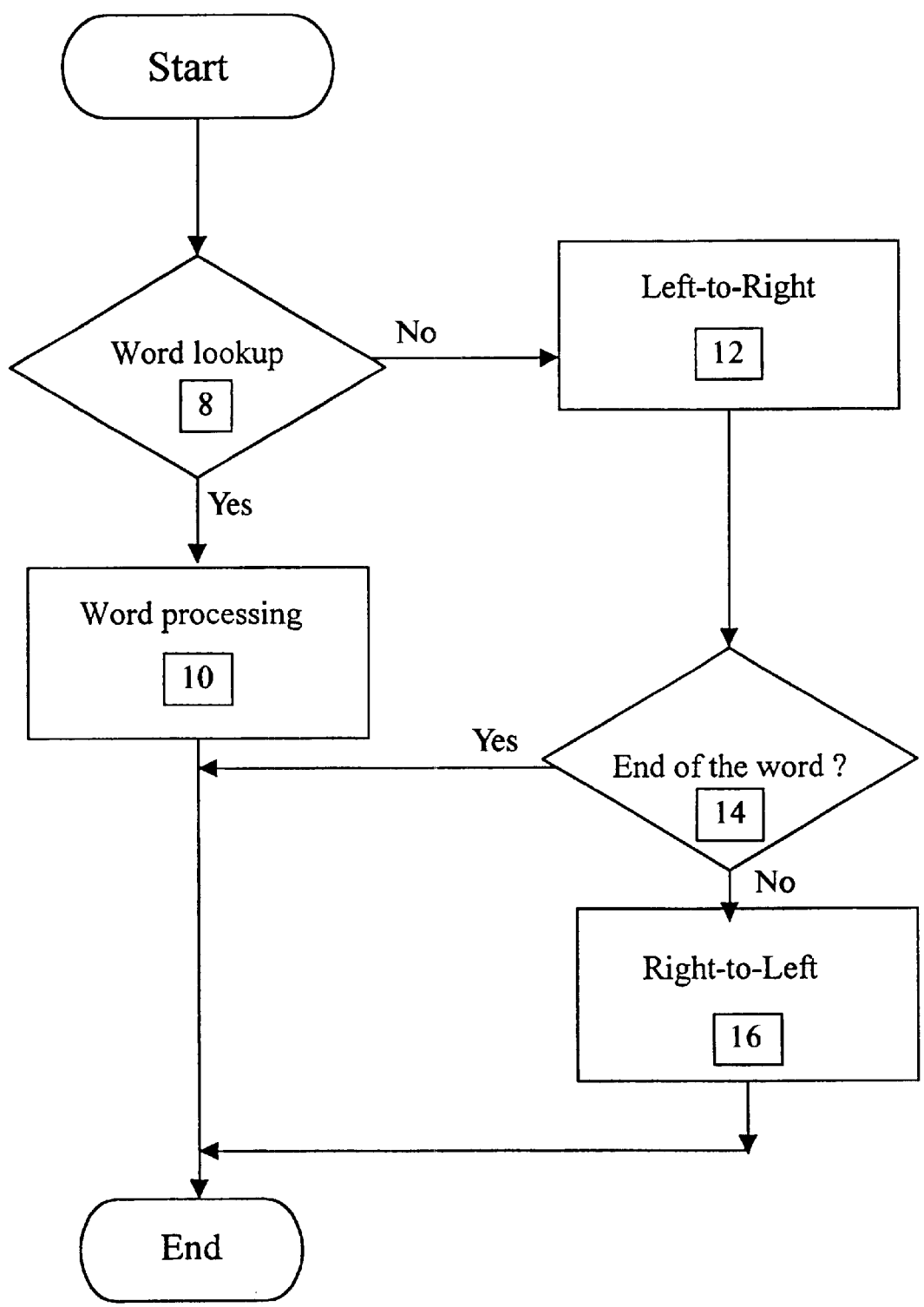
FIG. 2 is a flow chart of the processing of words.
Figure 3:
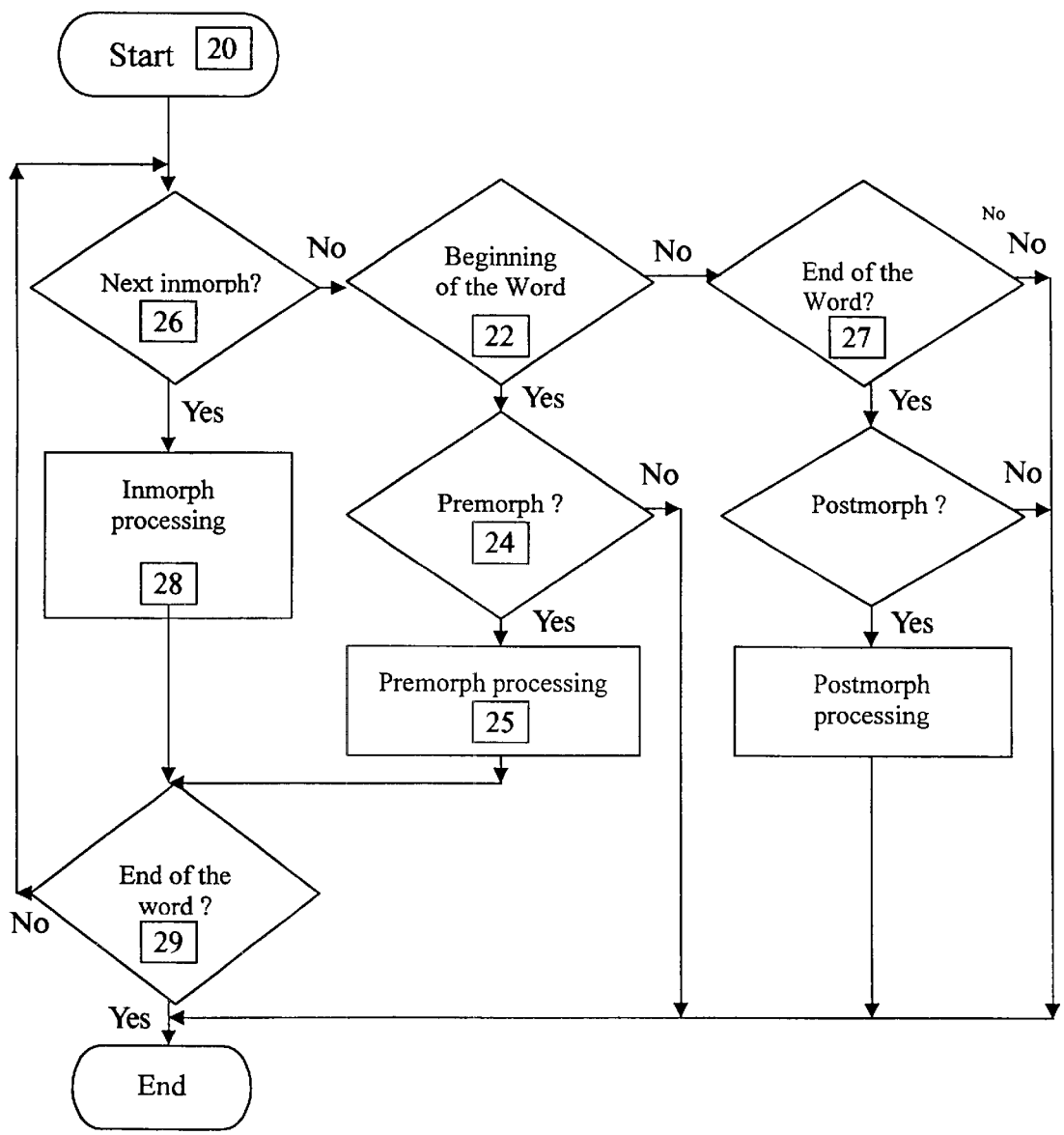
FIG. 3 is a flow chart of the left-to-right part of the flow chart of FIG. 2.

Still referring to FIG. 1 which shows a general flow chart of the word-by-word analysis of a phrase from left to right 2. After each word is processed, the next word 4 is retrieved for analysis until the last word in the phrase is analyzed and the process terminates 6. The word processing block in this chart is shown in more detail in FIGS. 2, 3 and 4. In FIG. 2, the block START indicates the start of processing a current word that is already stored or otherwise available to the computer processing system. Lookup 8 is performed on the whole word in WordMorph Dictionary. If found the Semantic Factors in this word contribute 10 to the list in the Phrase Concept Code and the processing of this word terminates. If the word is not found, the analysis proceeds to the left-to-right splitting of the word into S-Morphs 12. The left-to-right splitting of the word is shown in more detail in FIG. 3. At the start 20 of splitting a word, the logic goes searches for Inmorphs 26 and processes 28 those Inmorphs until the end of the word 29 is found and the processing of that word is complete. If an Inmorph is not found then the logic proceeds to look if the beginning of a word 22 is found and the associated Premorphs 24 are processed 25. The logic goes back to searching for Inmorphs as described above. However, if an Inmorph is not found, and the beginning of a word is not found then the logic continues to see if the end of the word has occurred 27. If yes then the postmorph is processed and the analysis of this word is complete. When any of the S-morphs are found the corresponding Semantic Factors are added to the Phrase Concept Code. With reference to FIG. 3, if the end of the word was not found, then the processing of this word was stopped in the middle of the word, and the system then proceeds to analyze the word in a right-to-left splitting of the word into S-Morphs 16 of FIG. 2. This is shown in more detail in FIG. 4. Here Inmorphs 31, if found, are processed 33 until the end of the word is found 35. If the start with Inmorph appeared to be unsuccessful the Postmorph is tried 39 and processed 39a after which new cycle with Inmorphs is tried. The end of the word 35 this time is defined by reaching the stop-point of the left-to-right processing 37 of the word or by being stopped somewhere in the middle of the word once more (no current Inmorph 31 or Postmorph 39 found) and the analysis terminates. At this point the S-Morphs from both left-to-right and right-to-left processing will contribute to the Phrase Concept Code as discussed below. Consider that the current word to be processed is GASTROENTEROLOGY. In block 8 no WordMorph was found and the system proceed in the left-to-right splitting 12. Within this block, InMorphs GASTRO and ENTERO and PostMorph LOGY were found. Using the S-Morph dictionary the corresponding Semantic Factors are found and contribute to the Phrase Concept Code. After the end of the word is found 14 the processing terminates.

Figure 4:
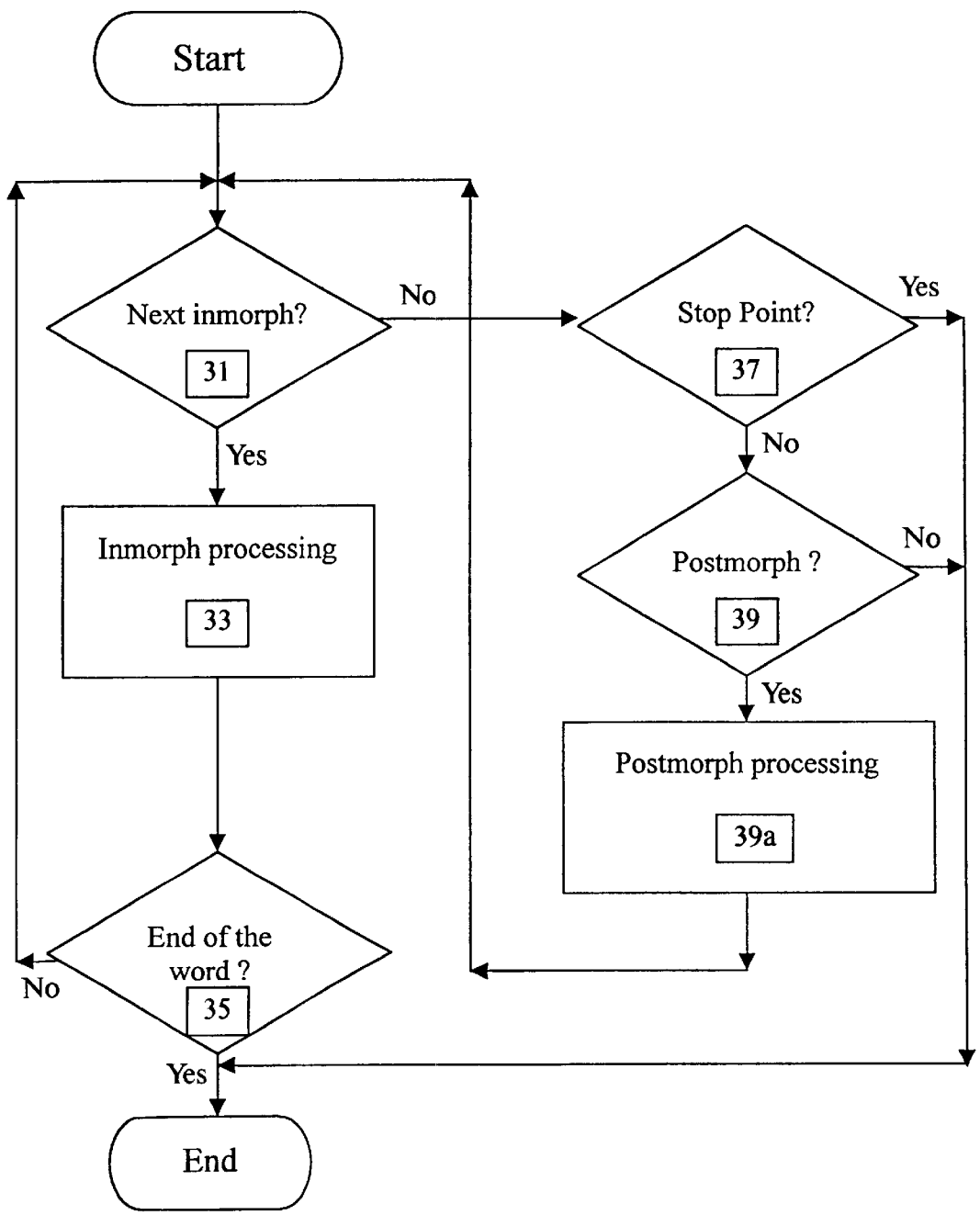
FIG. 4 is flow chart of the right-to-left part of the flow chart of FIG. 2.

Consider now that the word being analyzed is GASTROZIEMANENTEROLOGY. The process is identical to the above, except when ZIEMAN is found, the left-to-right processing stops because there is no S-morph ZIEMAN in the dictionary. The process continues in a right-to-left direction. The processing is the same, and when ZIEMAN is found going right-to-left the processing stops again. The two stop points may coincide, but if not the first stop is always to the left of the second. In the example above the ZIEMAN piece will be between the two sops. In either case the S-Morphs found from both directions are listed. Since there is no order dependencies on the inventive S-Morph process, the S-Morphs found from either or both directions will result in the same list of S-Morphs. The process will discard the duplicates. The process, as described above, will also discard any pieces of words that are not understood, like ZIEMAN in the example above, but will interpret the rest of the word. The word by word processing continues until all the words in the phrase being analyzed have been processed An important feature here, as described above, is that S-Morph-by-S-Morph "Word Processing" analysis 2 (FIG. 1) of each word in a phrase proceeds left-to-right either to first a successful end of processing or to second a Stop Point where the next part of the word or phrase cannot be identified. In the second case the Stop Point may be stored in the memory and the analysis continues, as discussed above, in right-to-left direction maximum to conclusion. As a result if there is an "unknown" piece in the middle of a word everything to the right and to the left of the piece is interpreted as in the example above. Similarly, if analysis 2 (both left-to-right and right-to-left) failed to identify any S-Morph for the word this whole word is considered as "unknown" and neglected, but other words in the phrase to the left and to the right are processes and interpreted. FIG. 3 and FIG. 4 show left-to-right and right-to-left processing of the word in more detail. In both charts special measures can be seen for identifying Premorphs and Postmorphs which can be found only in the beginning and in the end of the word correspondingly. WordMorph, Premorph, Inmorph and Postmorph Processing blocks in the charts represent the actual lookup in the corresponding S-Morph dictionaries, and, if the entry is found, add corresponding Semantic Factors to the current Phrase Concept Code.

Figure 5:
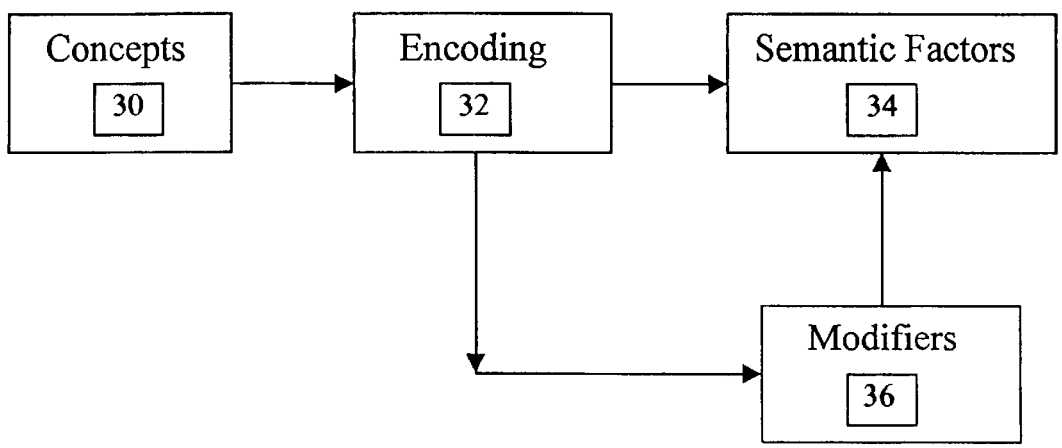
FIG. 5 is a block diagram describing concepts using Semantic Factors.

FIG. 5 shows an example of the relationship of concepts and Semantic Factors. A concept 30 is determined and encoded 32. A list of these codes is stored in the computer system as Semantic Factors. A list of modifiers is also stored 36 for use with the semantic Factors. The result is a list of Semantic Factors some of which are modified.

Figure 6:
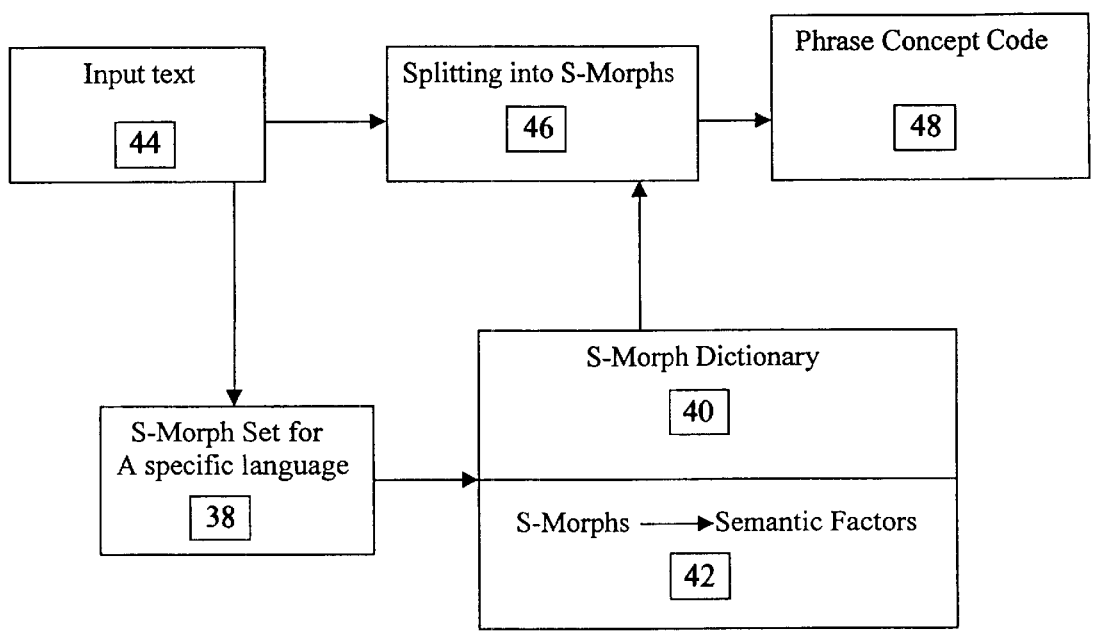
FIG. 6 is a block diagram of extracting meanings from text.

Referring to FIG. 6, for any specific language a list 38 of S-Morphs is determined and stored as a dictionary 40. This dictionary relates the S-Morphs to the Semantic Factors 42, some or which are modified. The computer system processes input text 44 by splitting or parsing the words of that text 46 into S-Morphs as described above. The S-Morph dictionary can be prepared by techniques described herein performed by experts in each of the languages being processed.

The process terminates with the building of the Concept Code 48 for the Input text.

For example, consider the phrase "HIGH PRESSURE IN BLOOD," In addition to two Semantic Factors mentioned earlier (&BLOOD—blood; &PRESS—press) two more Semantic Factors are found to build the Concept Code for this phrase: &HEIGHT—height and &IN—inside. The S-Morph analysis will split the phrase in the following way:

| HIGH-wordmorph | &+&HEIGHT |
| PRESS-inmorph | &PRESS |
| URE-postmorph | 0 |
| IN-inmorph | &IN |
| BLOOD-inmorph | &BLOOD |

Notice that the first S-Morph has two alternative meanings: one–excess reflected by the modifier+and second–height (as in high hill). The third S-Morph is empty S-Morph. The resulting Phrase Concept Code for the phrase above is:

&+PRESS&BLOOD&HEIGHT&IN&PRESS

Notice the effect of the modification of the Semantic Factor PRESS: it is present in both modified (&+PRESS) and unmodified (&PRESS) ways which may be associated with alternative meanings.

For a given input language (like English) the processing algorithms of the TEXT to MEANING part of the present invention are universal for any concepts to be found, pointed to or retrieved. Switching to a different input language (at least for Indo-European languages) in most cases requires replacing only the S-Morph dictionaries keeping the same processing algorithms.

EXAMPLE B

Meaning to Object (Presenting, Retrieval or Pointing out Object that is Relevant to a Given Meaning.)

Figure 7:
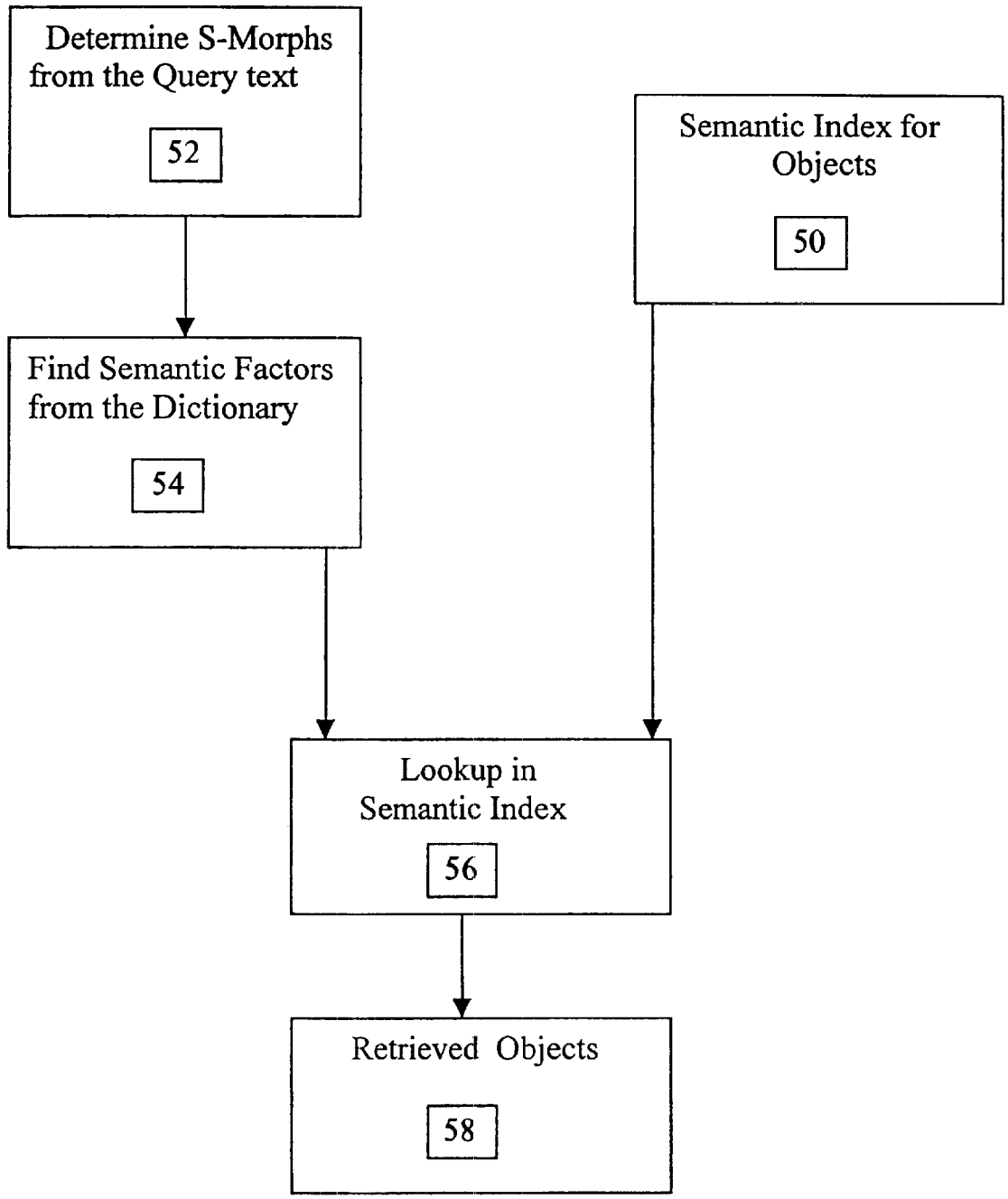
FIG. 7 is a block diagram of conceptual retrieval of objects.

FIG. 7 shows the overview of the present invention when searching for an object. This part of processing is specific to the set of data or text records/documents, herein a record/ documents is defined as a subject object or "object" to be retrieved 50. All such objects should be described as concepts using groupings of the Semantic Factors and/or modifiers. This can be done either fully automatically or interactively (with better quality) by analyzing schemes of TEXT to MEANING described above. Such descriptions may be named Semantic Index for a set of objects forming this set. The Semantic Index is actually a list of pointers from Phrase Concept Codes to objects. After the Semantic Index is prepared the retrieval becomes possible by looking up in the Semantic Index and finding entries for which all Semantic Factors associated with an object are contained in the input query Concept Code. In another preferred embodiment a threshold of how many Semantic Factors contained in the input query are contained in the Semantic Index may be determined by trial and error and may be used to determine when an acceptable match is found. In contrast to current search and retrieval systems, the present invention provides for conceptual rather than literal matches. Text is analyzed and S-morphs are determined 52 for the query text. The S-Morphs are "looked up" in the dictionary and Semantic Factors and modifiers are found 54. The Semantic Factors are grouped together and the group converted to the "concepts" by comparing 56 with the Semantic Index. The output 58 is presented which in a preferred embodiment includes pointers to the objects.

For example, assume that an output phrase to be retrieved contains the term HYPERTENSION with the Semantic Factor description &+PRESS&BLOOD (see above). This means that there is a pointer in the Semantic Index: &+PRESS&BLOOD that points to HYPERTENSION. Now, if an input query was to find HIGH PRESSURE IN BLOOD, the system will retrieve or point to HYPERTENSION because the Semantic Factor description of this term is contained in the Phrase Concept Code of the query. The initial text to a final output transformation may be better understood with the following sequence chart (where ">" refers direction of analysis):

HIGH BLOOD PRESSURE>&+
   PRESS&BLOOD&HEIGHT&IN&PRESS>&+
   PRESS&BLOOD>HYPERTENSION.

Here asking the system if HIGH BLOOD PRESSURE occurs in the text being considered, the system would output will retrieve the word HYPERTENSION that was part of the text. Notice here how the ambiguity associated with the double meaning of HIGH is resolved. Though in the Concept Code of the query both meanings are presented for HEIGHT (modified &+PRESS and unmodified &PRESS with &HEIGHT) the Semantic Index entry matches only the first meaning and correct output is received. This happens because the Semantic Index works with concepts but not words and it does not "know" about homonyms on the input side—it always uses one particular concept in each of its entry. This is another unique feature of the invention providing conceptual means for resolving homonymy.

The Semantic Index is completely independent of the input language because it is a Phrase Concept Code. This means that the same Semantic Index will work with queries in any input language since corresponding language S-Morph dictionaries were used to generate the query Phrase Concept Code. This feature allows for ease in building multilingual interfaces to text data.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. Apparatus for relating meanings and text, said text associated with a given language, said apparatus including a computing system, comprising:
   means for forming a set of concepts wherein said concepts relate to meanings for any language,
   means for storing said concepts within the computing system,
   means for forming morpheme-type linguistic elements specific to said given language,
   means for storing the linguistic elements in the computing system,
   dictionary means for associating said concepts with the linguistic elements,
   means for splitting said text into the linguistic elements, and
   means for looking up the linguistic elements in said dictionary and retrieving the related concepts, thereby relating said meanings to said text.

2. The apparatus as defined in claim 1 wherein said dictionary means for associating the concepts with linguistic elements includes multiple alternative concepts for the same linguistic element.

3. The apparatus as defined in claim 1 wherein said concepts comprise independent concepts of human understanding.

4. The apparatus as defined in claim 1 further comprising modifiers for said concepts, wherein said modifiers add quantitative and comparative information about said concepts, and wherein said modifiers are retained with said related concepts.

5. The apparatus as defined in claim 1 wherein said linguistic elements comprise:
   first type linguistic elements identified with the beginning of a word,
   second type linguistic elements identified with any position within a word,
   third type linguistic elements identified with the end of a word, and
   fourth type linguistic elements identified with a separate word.

6. The apparatus as defined in claim 5 wherein said linguistic elements comprise fifth type linguistic elements identified with abbreviations.

7. The apparatus as defined in claims 1 wherein said text is of any human language.

8. The apparatus as defined in claim 1 wherein said means for splitting said text into linguistic elements comprises means for processing said text in both a left-to-right and a right-to-left direction.

9. The apparatus as defined in claim 1 wherein when said linguistic element is not found in said dictionary, said process omits that linguistic element and continues processing.

10. The apparatus as defined in claim 1 further comprising:
    means for forming groups of said concepts;
    means for defining objects with said groups; and
    means for matching the concepts relating to meanings from said text with said groups, whereby objects are determined to exist or not exist in said text.

11. The apparatus as defined in claim 1 further comprising:
    means for associating a group of concepts with a subject object, and
    means for matching said group of concepts associated with said subject object with said concepts associated with said linguistic elements, wherein, when a match is found, said subject object is determined to be within the meaning of said text, and when a match is not found, said subject object is determined not to be within the meaning of said text.

12. The apparatus as defined in claim 11 wherein said means for matching comprises:
    means for determining when alternative meanings are present in said dictionary, and
    means for choosing one of the alternative meanings, thereby providing no ambiguity associated with multiple meanings of said text.

13. The apparatus as defined in claim 11 further comprising a threshold for determining when a match is found, said threshold defines a given number of common concepts found that are associated with the linguistic elements and with said subject object.

14. A computer implemented process for relating meanings and text, said text associated with a given language, comprising the steps of:
    forming a set of concepts wherein said concepts relate to meanings of any language,
    storing said concepts within a computer system,
    forming a set of morpheme-type linguistic elements specific to said given language,
    storing the linguistic elements within the computer system,
    forming a dictionary relating the linguistic elements with said concepts,
    splitting said text into linguistic elements, and looking up the linguistic elements in said dictionary and retrieving the related concepts, thereby relating said meanings to said text.

15. The computer implemented process as defined in claim 14 wherein the step of forming a dictionary includes relating multiple alternative concepts to the same linguistic element.

16. The computer implemented process as defined in claim 14 further comprising the steps of:
    forming groups of said concepts;
    defining objects with said groups; and
    matching the concepts relating to meanings from said text with said groups, whereby objects are determined to exist or not exist in said text.

17. The computer implemented process as defined in claim 14 further comprising the step of forming said concepts as independent concepts of human understanding.

18. The computer implemented process as defined in claim 14 further comprising the step of defining modifiers for said concepts, wherein said modifiers add quantitative and comparative information about said concepts, and wherein said modifiers are retained with said related concepts.

19. The computer implemented process as defined in claim 14 further comprising the steps of:
    identifying first linguistic elements with the beginning of a word,
    identifying second linguistic elements with any position within a word,
    identifying third linguistic elements with the end of a word, and
    identifying fourth linguistic elements with separate words.

20. The computer implemented process as defined in claim 19 further comprising the step of identifying fifth linguistic elements identified with abbreviations.

21. The computer implemented process as defined in claim 14 further comprising the step of determining that the text is of any human language.

22. The computer implemented process as defined in claim 14 wherein said step of splitting said text into linguistic elements comprises the step of processing said text in both a left to right and a right to left direction.

23. The computer implemented process as defined in claim 14 wherein when, in the step of looking up the linguistic element, a linguistic element is not found in said dictionary means for associating, said process omits that linguistic element and continues processing.

24. The computer implemented process as defined in claim 14 further comprising the steps of:
    associating a group of concepts with a subject object,
    matching said group of concepts associated with said subject object with said concepts associated with said linguistic elements, wherein, when a match is found, said subject object is determined to be within the meaning of said text, and when a match is not found, said subject object is determined not to be within the meaning of said text.

25. The computer implemented process as defined in claim 24 further comprising the steps of:
    determining when alternative meanings are present in said dictionary, and
    choosing one of the alternative meanings, thereby providing no ambiguity associated with multiple meanings of said text.

26. The computer implemented process as defined in claim 24 further comprising the step of defining a threshold, wherein a match is found when said threshold is met, wherein said threshold defines a given number of common concepts found that are associated with the linguistic elements and with said subject object.

27. A computer-readable medium bearing a program code embodied therein for relating meanings and text, said text associated with a given language, and including:
    a first computer readable file for forming a set of concepts wherein said concepts relate to meanings of any language,
    a second computer readable file for storing said concepts within a computer system,
    a third computer readable file for forming a set of morpheme-type linguistic elements for said given language,
    a fourth computer readable file for storing said linguistic elements,
    a fifth computer readable file defining a dictionary for associating said concepts with linguistic elements,
    a sixth computer readable file—program for splitting said text into the linguistic elements,
    a seventh computer readable file defining subject objects with groups of said concepts, said groups defining a semantic index, and
    an eighth computer readable file—program for looking up said groups of concepts in said semantic index and retrieving the related objects, thereby relating said meanings to said objects.

* * * * *